United States Patent
Gunther

(10) Patent No.: US 7,910,255 B2
(45) Date of Patent: Mar. 22, 2011

(54) CHARGE AIR HUMIDIFICATION FOR FUEL CELLS

(75) Inventor: Detlef Gunther, Mainz-Kastel (DE)

(73) Assignee: GM Global Technology Operations LLC, Detroit, MI (US)

(*) Notice: Subject to any disclaimer, the term of this patent is extended or adjusted under 35 U.S.C. 154(b) by 507 days.

(21) Appl. No.: 10/641,565

(22) Filed: Aug. 15, 2003

(65) Prior Publication Data

US 2005/0037250 A1   Feb. 17, 2005

(51) Int. Cl.
*H01M 8/04* (2006.01)
*H01M 8/06* (2006.01)

(52) U.S. Cl. ........ 429/436; 429/437; 429/450; 429/414; 429/408

(58) Field of Classification Search ............. 429/20, 429/12, 26, 436, 437, 450, 414, 408
See application file for complete search history.

(56) References Cited

U.S. PATENT DOCUMENTS

| | | | |
|---|---|---|---|
| 5,360,679 A * | 11/1994 | Buswell et al. | 429/19 |
| 5,958,614 A * | 9/1999 | Takei et al. | 429/26 |
| 6,013,385 A * | 1/2000 | DuBose | 429/17 |
| 6,238,814 B1 * | 5/2001 | Horiguchi et al. | 429/12 |
| 6,428,915 B1 | 8/2002 | Ban et al. | |
| 6,924,051 B2 * | 8/2005 | Meissner et al. | 429/26 |
| 7,101,636 B2 * | 9/2006 | Tajima | 429/22 |
| 2001/0001287 A1 * | 5/2001 | Ueno et al. | 429/22 |
| 2002/0004152 A1 * | 1/2002 | Clawson et al. | 429/17 |
| 2002/0086194 A1 | 7/2002 | Blaszczyk et al. | |
| 2002/0098395 A1 | 7/2002 | Shimanuki et al. | |
| 2002/0106537 A1 | 8/2002 | Saito | |
| 2002/0150803 A1 | 10/2002 | Yang | |
| 2002/0155328 A1 | 10/2002 | Smith et al. | |
| 2002/0182462 A1 * | 12/2002 | Ballantine et al. | 429/23 |

FOREIGN PATENT DOCUMENTS

| | | |
|---|---|---|
| DE | 101 20 947 | 4/2001 |
| DE | 10154621 | 5/2003 |
| EP | 1 009 053 | 10/1999 |

OTHER PUBLICATIONS

German Office Action issued on Oct. 20, 2010 in related matter German Patent Application DE 10 2004 038 633.1-45.

* cited by examiner

*Primary Examiner* — Patrick Ryan
*Assistant Examiner* — Helen O Conley
(74) *Attorney, Agent, or Firm* — Harness, Dickey & Pierce, P.L.C.

(57) ABSTRACT

A fuel cell system includes a fuel cell stack that receives a cathode feed gas and has an exhaust stream and a heat transfer stream flowing therefrom. A charge-air heat exchanger enables heat transfer between the heat transfer stream and the cathode feed gas. The charge-air heat exchanger also enables heat transfer between the heat transfer stream and the cathode feed gas to compensate for the adiabatic cooling effect. Furthermore, the charge-air heat exchanger vaporizes the liquid water to provide water vapor. The water vapor humidifies the cathode feed gas.

8 Claims, 3 Drawing Sheets

CHARGE AIR HUMIDIFICATION FOR FUEL CELLS

FIELD OF THE INVENTION

The present invention relates to fuel cell systems, and more particularly to humidifying charge air delivered to a fuel cell stack.

BACKGROUND OF THE INVENTION

Fuel cell systems are increasingly being used as a power source in a wide variety of applications. Fuel cell propulsion systems have also been proposed for use in vehicles as a replacement for internal combustion engines. The fuel cells generate electricity that is used to charge batteries and/or to power an electric motor. A solid-polymer-electrolyte fuel cell includes a membrane that is sandwiched between an anode and a cathode. To produce electricity through an electrochemical reaction, a fuel, commonly hydrogen ($H_2$), but also either methane ($CH_4$) or methanol ($CH_3OH$), is supplied to the anode and an oxidant, such as oxygen ($O_2$) is supplied to the cathode. The source of the oxygen is commonly air.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane. The electrons flow through an electrical load (such as the batteries or the electric motor) that is connected across the membrane. In a second half-cell reaction, oxygen ($O_2$) at the cathode reacts with protons ($H^+$), and electrons ($e^-$) are taken up to form water ($H_2O$).

The relative humidity of the oxidant impacts durability and efficiency of the fuel cell system. Conventional strategies have been developed to humidify the oxidant flowing to the fuel cell. These strategies, however, present certain disadvantages. One disadvantage is that the achievable humidification level is limited. Other disadvantages include low durability, higher cost and increased space requirements.

SUMMARY OF THE INVENTION

Accordingly, the present invention provides a fuel cell system. The fuel cell system includes a fuel cell stack that receives a cathode feed gas and has an exhaust stream and a heat transfer stream flowing therefrom. A charge-air heat exchanger enables heat transfer between the heat transfer stream and the cathode feed gas to adjust a feed gas temperature. The charge-air heat exchanger also enables heat transfer between the heat transfer stream and a liquid water to vaporize the liquid water providing water vapor. The water vapor humidifies the cathode feed gas. Preferably, the source of liquid water is a water condensate originating from within the fuel cell system. In one aspect, the heat transfer stream includes a fluid operable to heat and cool as needed. An important feature is cooling and therefore, the heat transfer stream is referred to as coolant for simplicity. It is appreciated, however, that it is not limited to cooling as it may also heat.

In one feature, the fuel cell system further includes a condenser that condenses water vapor in the exhaust stream.

In another feature, the fuel cell system includes an injector that injects the water condensate into the cathode feed gas. Preferably, the injector forms a part of the charge-air heat exchanger or is adjacent the charge-air heat exchanger.

In still another feature, the fuel cell system further includes a compressor that compresses the cathode feed gas. The compressor receives a portion of the water condensate to humidify the cathode feed gas within the compressor. The compressor comprises an injector that injects the water condensate into the cathode feed gas. The water condensate is vaporized within the compressor during a compression process.

In yet another feature, a portion of the water condensate is injected into the fuel cell stack to humidify the cathode feed gas within the fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
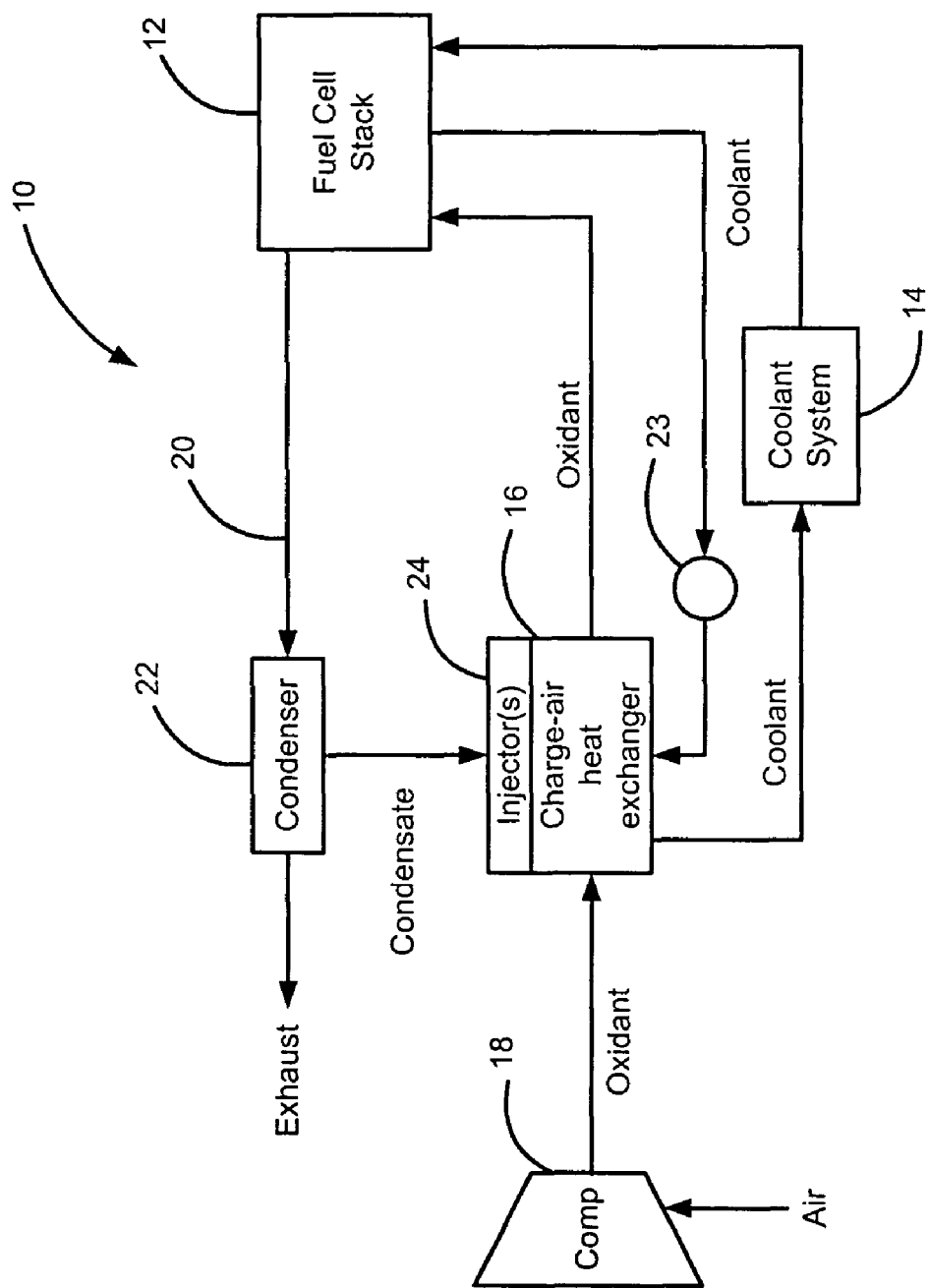
FIG. 1 is a fuel cell system including charge air humidification according to the present invention.

Referring now to FIG. 1, a fuel cell system 10 is shown. The fuel cell system 10 includes a fuel cell stack 12, a coolant system 14, a charge-air heat exchanger 16 and a compressor 18. The coolant system 14 maintains the operating temperature of the fuel cell stack 12 at an appropriate level. Additionally, the coolant system 14 adjusts the temperature of fluids at various points in the fuel cell system 10 as explained in further detail below. The compressor 18 compresses oxidant that is supplied to the fuel cell stack 12. More specifically, the oxidant is supplied as a cathode feed gas or charge air to a cathode side (not shown) of the fuel cell stack 12. The cathode feed gas catalytically reacts with a hydrogen-rich reformate supplied to an anode side (not shown) of the fuel cell stack 12. The oxidant is oxygen-rich air supplied by the compressor 18 and charge-air heat exchanger 16 at an appropriate operating state (i.e., temperature and pressure). The oxidant reacts with the hydrogen-rich reformate to produce electrical power and an exhaust stream.

The exhaust stream is made up of reaction products including water ($H_2O$) vapor and a small amount of liquid $H_2O$ depending on the operating strategy of the fuel cell stack 12. The $H_2O$ vapor condenses as it travels through an exhaust conduit 20 to provide an $H_2O$ condensate. The exhaust conduit 20 can be configured to maximize the surface area over which the exhaust stream passes to enable condensation of the $H_2O$ vapor. Alternatively, a condenser 22 can be included to condense the $H_2O$ vapor to provide the $H_2O$ condensate. It is also anticipated that the source of $H_2O$ can be provided from a means other than the exhaust stream. For example, a separate water storage tank (not shown) can be used to supply liquid $H_2O$.

The coolant system 14 controls coolant flow through the fuel cell system 10 and includes a pump (not shown) and a radiator (not shown) that enables heat transfer to atmosphere.

As used herein, the term coolant refers to a heat transfer fluid that is able to cool and heat as needed. For example, in a situation where the coolant is warmer than an adjacent fluid or structure, the coolant serves to heat that adjacent fluid or structure. Similarly, in a situation where the coolant is cooler than an adjacent fluid or structure, the coolant serves to cool that adjacent fluid or structure. Coolant is pumped through the fuel cell stack 12 to cool the fuel cell stack 12 and maintain an operating temperature of the fuel cell stack 12. The coolant flows from the fuel cell stack 12, through the charge-air heat exchanger 16 and back to the coolant system 14. A regulator valve 23 is optionally provided to control the flow rate of coolant to the charge-air heat exchanger 16. As described in further detail below, the heat of compression and heat transfer from the coolant enables vaporization of the $H_2O$ condensate. The heat exchanger adjusts the cathode feed gas to an appropriate temperature for reaction in the fuel cell stack 12.

The $H_2O$ condensate and coolant are directed to the charge-air heat exchanger 16 and cooperate to humidify the cathode feed gas. More particularly, an injector or multiple injectors 24 are provided to inject the $H_2O$ condensate into the cathode feed gas as it flows through the charge-air heat exchanger 16. The coolant is in heat exchange relationship with the cathode feed gas and injected $H_2O$ condensate. Preferably, the adiabatic cooling effect occurs whereby the charge air temperature drops and the $H_2O$ condensate is vaporized to form $H_2O$ vapor. Additionally, heat transfer occurs from the coolant to the $H_2O$ condensate, vaporizing the $H_2O$ condensate. Concurrently, heat transfer occurs from the coolant to the cathode feed gas, reheating the cathode feed gas. As a result, the process in one embodiment is operable essentially at constant temperature and pressure (i.e., state) maintained by the coolant (i.e., working fluid).

Depending upon the amount of the $H_2O$ condensate that must be injected to humidify the cathode feed gas to an appropriate level, a multi-stage humidification process is provided in one embodiment. The multi-stage humidification process includes a first stage with an injector 24 for injecting a first volume of the $H_2O$ condensate into the cathode feed gas. The first volume is vaporized within the cathode feed gas stream in the heat transfer process as described above. A second stage includes a second injector 24 for injecting a second volume of the $H_2O$ condensate into the partially humidified cathode feed gas. The second volume is vaporized within the cathode feed gas stream in the adiabatic heat transfer process as described above. Two or more stages (e.g., third and fourth stages) can be implemented to achieve the desired humidity level of the cathode feed gas.

Figure 2:
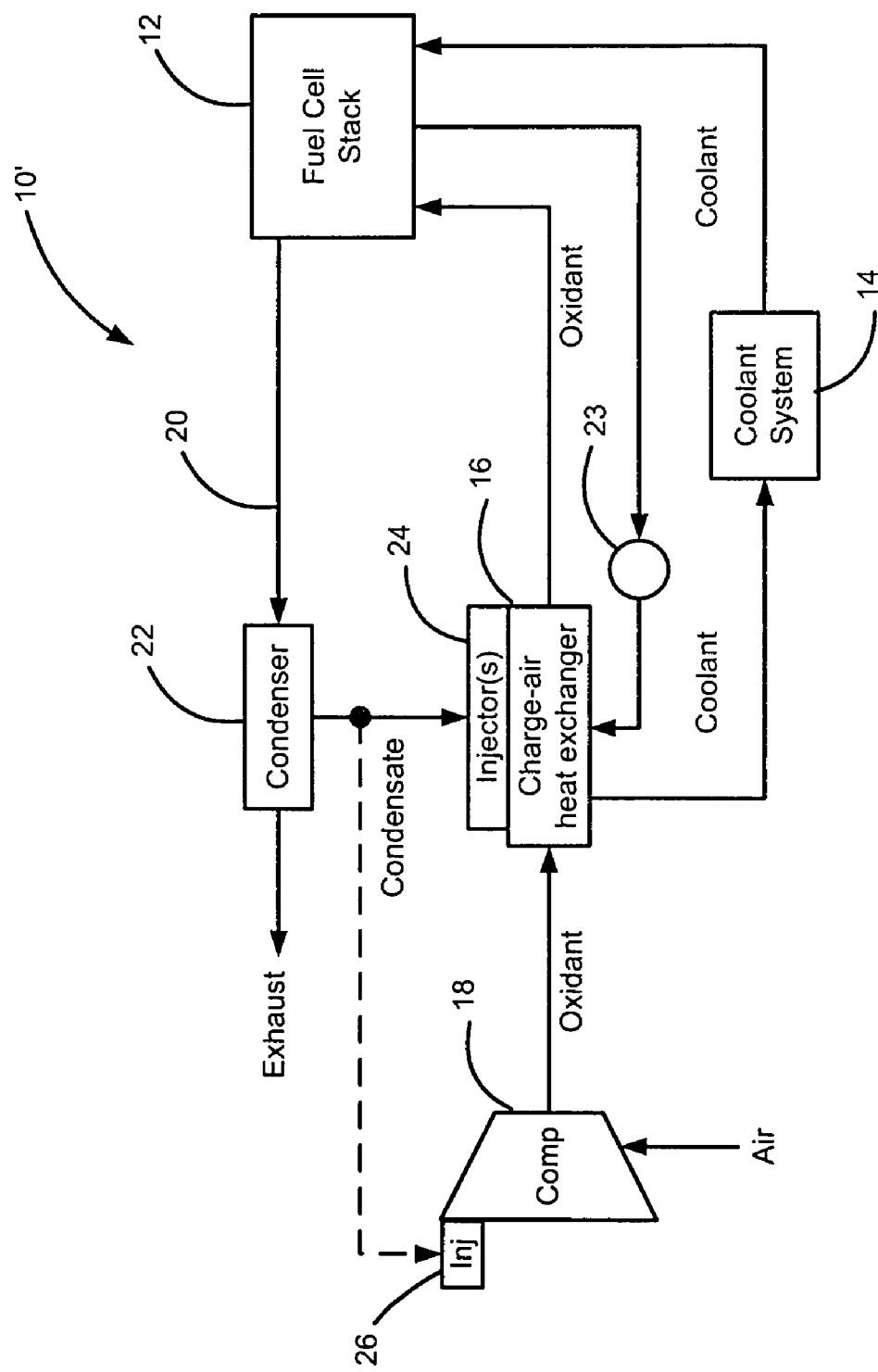
FIG. 2 is an alternative fuel cell system including charge air humidification according to the present invention.

Referring now to FIG. 2, a fuel cell system 10' is shown and includes humidification of the cathode feed gas within the compressor 18. More specifically, a portion of the $H_2O$ condensate is fed to an inlet of the compressor 18. The compressor includes an injector 26 that injects the $H_2O$ condensate into the cathode feed gas at the compressor suction side. The compression process generates sufficient heat to vaporize a part of the $H_2O$ condensate, humidifying the cathode feed gas. Thus, the fuel cell system 10' of FIG. 2 provides for humidification of the cathode feed gas at both the compressor 18 and the charge-air heat exchanger 16, as described in detail above.

The proportion of cathode feed gas humidification that occurs within the compressor 18 to that which occurs within the charge-air heat exchanger 16 can be controlled. Due to the limited available heat of compression and dwell time, a smaller portion of humidification can occur within the compressor 18. As a result, the larger portion of humidification occurs within the charge-air heat exchanger 16 as detailed above. Alternatively, a larger portion of humidification can occur within the compressor 18. As a result, the smaller portion of humidification occurs within the charge-air heat exchanger 16. In such a case, the multi-stage humidification process may not be required depending on how much $H_2O$ condensate must be injected to sufficiently humidify the cathode feed gas.

Figure 3:
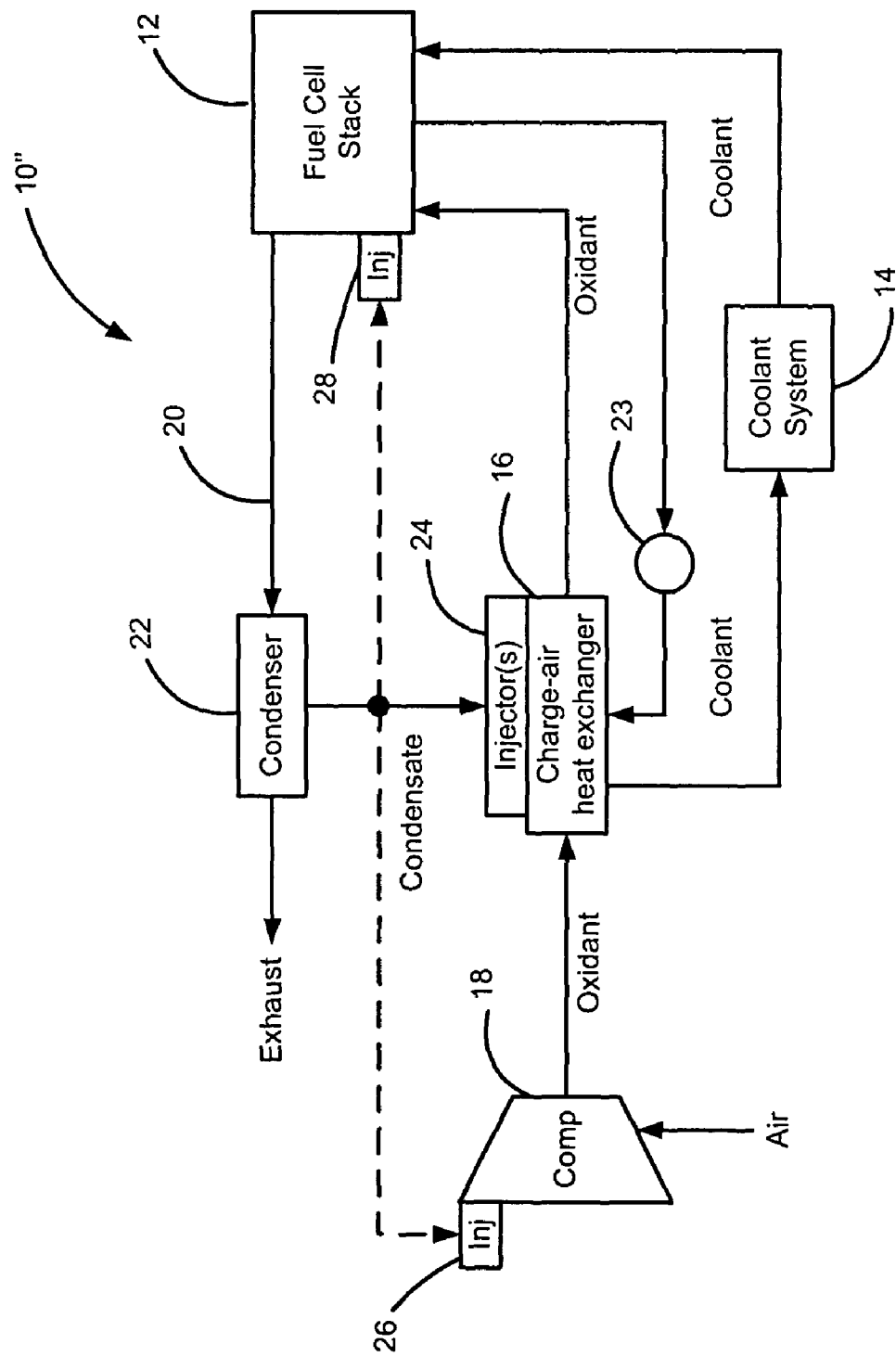
FIG. 3 is another alternative fuel cell system including charge air humidification according to the present invention.

Referring now to FIG. 3, a fuel cell system 10" is shown and includes humidification of the cathode feed gas within the compressor 18, the cooler 16 and the fuel cell stack 12. More specifically, a portion of the $H_2O$ condensate is fed to the compressor 18 for humidifying the cathode feed gas as described above with respect to FIG. 2. Additionally, a portion of the $H_2O$ condensate is fed to the fuel cell stack 12. An injector 28 is provided to inject the $H_2O$ condensate into the cathode feed gas within the fuel cell stack 12. Heat transfer occurs to vaporize the $H_2O$ condensate, humidifying the cathode feed gas within the fuel cell stack 12. Thus, the fuel cell system 10" of FIG. 3 provides for humidification of the cathode feed gas at the compressor 18 and at the charge-air heat exchanger 16 as described in detail above, as well as within the fuel cell stack 12 itself. As described above with reference to FIG. 2, the proportion of humidification that occurs within the compressor 18, the charge-air heat exchanger 16 and the fuel cell stack 12 can vary as design requirements dictate.

The fuel cell systems of the present invention include several distinct advantages over conventional humidification strategies. One advantage is that overall system durability and efficiency is improved. This is a result of a higher achievable humidification level over conventional systems and a reduced heat load on the cooling system. The reduced heat load is a result of the heat that would otherwise be discharged through the coolant system being used to vaporize the $H_2O$ condensate within the cooler. As a result, lower system temperatures and a more stream-lined coolant system including a smaller radiator are achieved. Additionally, less liquid $H_2O$ exits the exhaust of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system, comprising:
    a charge-air heat exchanger having a first passage and a second passage, wherein said first passage comprises a cathode feed gas inlet, a liquid water inlet comprising an injector arranged to inject said liquid water into a cathode feed gas as said cathode feed gas passes through said charge-air heat exchanger, and a cathode feed gas outlet and said second passage comprises a heat transfer stream inlet, wherein said first and second passages are in heat transfer relationship with and are separated from one another;
    a fuel cell stack having a cathode inlet that receives said cathode feed gas after exiting said cathode feed gas outlet of said charge-air heat exchanger and a cathode outlet for an exhaust stream, wherein said heat transfer stream circulates through said fuel cell stack to transfer heat to or from said fuel cell stack; and
    a coolant system comprising a radiator and a coolant system loop that circulates said heat transfer stream from said fuel cell stack to said heat transfer stream inlet and through said second passage of said charge air-heat exchanger and then back to said fuel cell stack; wherein said charge-air heat exchanger enables heat transfer between said second passage and said first passage by optionally cooling or reheating said cathode feed gas and vaporizing said liquid water to humidify said cathode feed gas prior to said cathode inlet of said fuel cell.

2. The fuel cell system of claim 1 wherein said heat transfer stream functions to alternatively cool and heat said cathode feed gas.

3. The fuel cell system of claim 1 further comprising a condenser that condenses water vapor in said exhaust stream to provide said liquid water as a condensate.

4. The fuel cell system of claim 1 further comprising a compressor that compresses said cathode feed gas.

5. The fuel cell system of claim 4 wherein said compressor is upstream of said charge-air heat exchanger and receives a portion of said liquid water to humidify said cathode feed gas within said compressor.

6. The fuel cell system of claim 4 further comprising an injector arranged to inject said liquid water into said cathode feed gas.

7. The fuel cell system of claim 4 wherein a portion of said liquid water is vaporized within said compressor during a compression process.

8. The fuel cell system of claim 1 wherein a portion of said liquid water is injected into said fuel cell stack to humidify said cathode feed gas within said fuel cell stack.

* * * * *